United States Patent
Shigemori et al.

(10) Patent No.: US 6,473,761 B1
(45) Date of Patent: Oct. 29, 2002

(54) AGENT SYSTEM

(75) Inventors: Yutsuka Shigemori, Kyoto (JP); Takefumi Naganuma, Kyoto (JP); Akira Nakajima, Kyoto (JP); Tetsuto Nishiyama, Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 09/276,755

(22) Filed: Mar. 26, 1999

(51) Int. Cl.[7] ............................................. G06F 17/30
(52) U.S. Cl. ........................ 707/100; 709/202; 709/238; 709/243
(58) Field of Search ................................ 709/315, 224, 709/318, 202–238, 242, 243; 707/100, 101, 104.1

(56) References Cited

U.S. PATENT DOCUMENTS 5,701,484 A  * 12/1997 Artsy
5,790,854 A  *  8/1998 Spielman et al. ........... 395/701
6,016,393 A  *  1/2000 White et al. ................ 395/683
6,035,343 A  *  3/2000 Tsushima et al. ........... 709/318
6,141,686 A  * 10/2000 Jackowski et al. .......... 709/224
6,158,019 A  * 12/2000 Squibb ........................ 714/13
6,233,601 B1 *  5/2001 Walsh ........................ 709/202

* cited by examiner

Primary Examiner—Jean M. Corrielus
Assistant Examiner—Tam V Nguyen
(74) Attorney, Agent, or Firm—Dickstein Shapiro Morin & Oshinsky LLP

(57) ABSTRACT

The objective of the present invention is to provide an agent system in which it will not be necessary to respecify the destination and in which the dead time entails in specifying the destination will be minimized. Agent generating unit in the system agent generates mobile object with its attached routing list which indicates the object's destination. MPU converting unit converts agent to MPU code. Intermediate code converting unit changes to intermediate code, and outputs to the next communication device. In the communication device which received the agent, the MPU converting unit converts the agent to MPU code. Agent restoring unit restores the agent of MPU code to the original agent, and stores it in the memory area.

30 Claims, 15 Drawing Sheets

AGENT SYSTEM

FIELD OF THE INVENTION

This invention concerns an agent system in which an agent generated by an agent server is moved consecutively among communication devices via communication lines.

BACKGROUND OF THE INVENTION

A typical agent system of the type which has recently been proliferating is shown in FIG. 14. Agent server 50, various communication devices 60 (personal computers, work stations, etc.) and storage device 80, which stores a program to generate agents, are all connected via cable line 90 (or, although not pictured, they may be connected cordlessly). This line is used to transfer agent 70, which we shall discuss shortly, from one device to the next.

In such an agent system, agent server 50 generates, based on a source program, an agent 70 consisting of object code. The agent 70 which has been generated is transmitted to a designated communication device 60, where the system agent 601 for that device 60 executes it.

Agent systems of the sort described above use two methods to transmit an agent 70. In one method, the agent is given its destination and target processing but not the route by which it is to reach the destination. In the other method, the agent is given only its target processing and does not receive either its destination or its transmission route.

We shall now discuss these two methods for transmitting an agent, with reference to the flow charts in FIGS. 15 and 16.

Method 1: Agent is given destination and target processing.

Agent server 50 uses a source program which executes specific processing stored in storage device 80 to generate object code. It also generates an agent by assigning a destination to this object code to indicate where it is to go (Step 510), and it sends this agent 70 to its destination.

Agent 70 travels along line 90 to whichever communication device 60 has a node for the specified destination (Step 520). It is taken in by this device 60, whose system agent 601 executes it.

The system agent 601 of this device 60 renders a judgment as to whether the target processing assigned to agent 70 has been completed (Step 530). If it determines that the processing has not been completed (Step 530: N), it returns the agent to its source, agent server 50.

When agent 70 returns to agent server 50, the server respecifies its destination and target processing (Step 550). We return to 520, and the processing described above resumes.

If system agent 601 determines that the target processing has been completed (Step 530: Y), agent 70 is sent back to agent server 50 (Step 540) and the processing is completed.

Method 2: The agent is given only its target processing.

The agent system 601 for agent server 50 generates an agent with its target processing (Step 610). This agent 70 is transmitted via line 90 (Step 620).

Agent 70 is taken in at its destination, communication device 60, and the system agent 601 for that device begins to execute its target processing.

In device 60, the destination of agent 70, a judgment is rendered as to whether the target processing has been completed (Step 630). If it is determined that the processing has not been completed (Step 630: NO), agent 70 returns to step 620, goes to the communication device which is its next destination, and resumes the processing described above.

If system agent 601 determines that the target processing has been completed (Step 630: Y), it sends agent 70 back to agent server 50 (Step 540), and the processing is completed.

Regardless of whether the agent is given both its destination and its target processing or only its target processing, certain problems are inherent in the type of agent system described above.

In the first method mentioned above, in which agent 70 is given both its destination and its target processing, when the agent is to be routed through the nodes of a number of specified devices 60, each node will have to be specified, as there is a 1 to 1 correspondence of destinations when the target processing is executed.

Thus if the target processing cannot be accomplished, agent server 50 will have to respecify all of the destinations, which will result in dead time.

In the second method mentioned above, in which the agent is given only its target processing, it will move to an arbitrary location (searching according to a rule) and execute that processing. Once it is given its target processing, the agent will never need to have its target reassigned. However, there is no way to choose a route, so if the processing is sequential, and there is, for example, an application gateway in a fire wall, the attempt of the agent to pass through will be regarded as an access violation. The agent will be unable to continue to the nodes of the devices 60 on the other side of the fire wall.

(3) In either methods mentioned above, the one in which the agent is given both a destination and the target processing or the one in which it is given only the target processing, agent 70 sets out without knowing the resource state of its destination, device 60. For example, it does not know which regions of the device's memory are free. If it turns out that the agent is temporarily unable to use the resources of device 60 because, say, there is no free area in the memory to house it, agent 70 will not be generated in that device. It will not return to server 50 within the specified time, and server 50 will have no alternative but to execute error processing.

(4) Right now, the processing code used in device 60 is going to be native code, which is used by an ordinary MPU, or byte code expressed in JAVA, which is used in virtual machines.

As can be seen in FIG. 17, when an agent is sent between systems in which the system agents 601 in server 50 and device 60 use the same code, the system agent at the destination will be able to execute the agent. If the two systems use different codes, it will be unable to execute the agent.

If the two systems use different processing codes, the system to which the agent is sent must use a device 60 with a virtual processor such as a Java Virtual Machine.

SUMMARY OF THE INVENTION

The first objective of the present invention is to provide an agent system in which it will not be necessary to respecify the destination and in which the dead time entails in specifying the destination will be minimized.

The second objective of this invention is to provide an agent system in which even if the agent are not routed along a certain set of nodes, it will be able to select another node if need be.

The third objective of this invention is to provide an agent system which can avoid error processing by checking the resource state of the destination device before the agent goes there.

The fourth objective of this invention is to provide an agent system which can execute the processing when the agent is travelling between two systems using different processing codes.

In order to achieve the objectives mentioned above, this invention is configured for an agent system in which an agent server and a number of communication devices are connected via a communication line which may be a cable or cordless line. An agent with routing data generated by the aforesaid agent server travels among the aforesaid communication devices via the aforesaid communication line according to the aforesaid routing data.

The aforesaid communication devices is characterized by having a restoring and transmitting means to restore and transmit the agent which can modify the routing data for the agent which are received and stored in a memory, and which can restore the agent with a specified set of routing data and transmit the restored agent.

In this invention, the aforesaid communication devices is further characterized by having a memory area reserving means to reserve a memory area for the agent in a destining communication device to which the agent is to be sent according to the routing data.

The aforesaid communication devices is further characterized by having an agent's code converting means to convert an agent's code which, when according to the routing data the agent is about to be sent to a destining communication device which executes a different processing code, converts the agent to an intermediate code which the destining communication device can process, and transmits the intermediate code to the destining communication device.

The aforesaid communication devices is further characterized by having a memory area reserving and clearing means to reserve the memory area in the destining communication device before the restored agent is sent, and clear the restored agent in the memory area after the restored agent is sent.

In this invention, the aforesaid routing data consists of the numbers of the nodes through which the agent must pass as it moves between devices and the number of times it will be permitted to pass. The aforesaid restoring and transmitting means to restore and transmit an agent, when it restores an agent, subtracts 1 from the previous number of times the agent is permitted to pass that node, and sets the new number of permitted pass in the aforesaid routing data.

The aforesaid restoring and transmitting means deletes from the agent the routing data representing a given node number when the value obtained by subtracting 1 from the number of pass permitted to that node is 0.

When the aforesaid restoring and transmitting means restores an agent, as needed, it may add to the aforesaid routing data new nodes which the agent may pass.

Further it may, as needed, change the number of permitted pass in the routing data for a given node.

The numbers of the nodes of the devices which the aforesaid agent passes through are appended to the agent as cumulative route data. When it transmits an agent to another communication device, the aforesaid restoring and transmitting means may restore the agent with the current node number recorded as cumulative route data.

The aforesaid a memory area reserving means to reserve an area of the memory entails a current state detecting means to detect how far the processing of the received agent has progressed. When this detection means determines that the aforesaid agent has executed a specified location, it reserves an area of memory in the communication device to which the agent is being sent.

The agent server simultaneously transmits a number of agents having different routing data to a final communication device having a final destination node and reads out the cumulative route record from the agents which have returned, and the final communication device sends back to the agent server only the agent which was the first to arrive to the final communication device.

With this invention, the communication devices restore the agents which they receive with changed routing data as needed. This eliminates the need to respecify destinations.

Because the communication devices reserve an area of memory for its storage in whatever device the restored agent is about to be sent to, restored agents can be transmitted reliably to their destinations.

Because the communication devices convert the agent to an intermediate code before transmitting it, agents can be transmitted between devices using different processing systems.

With this invention, an agent acquires cumulative route data when it is restored. Thus when it is to be transmitted to another device, cumulative route data from the agent server through its destination device can be obtained.

Thus by simultaneously sending out a number of agents, the server can discover the quickest route to the destination from the cumulative route data of the first agent to arrive.

DETAILED DESCRIPTION OF THE INVENTION

<First Preferred Embodiment>

In this section we shall explain the agent system according to this invention with reference to the drawings. In the first embodiment of the agent system, system agent would restore a mobile agent consisting of a routing list and target processing.

Figure 1:
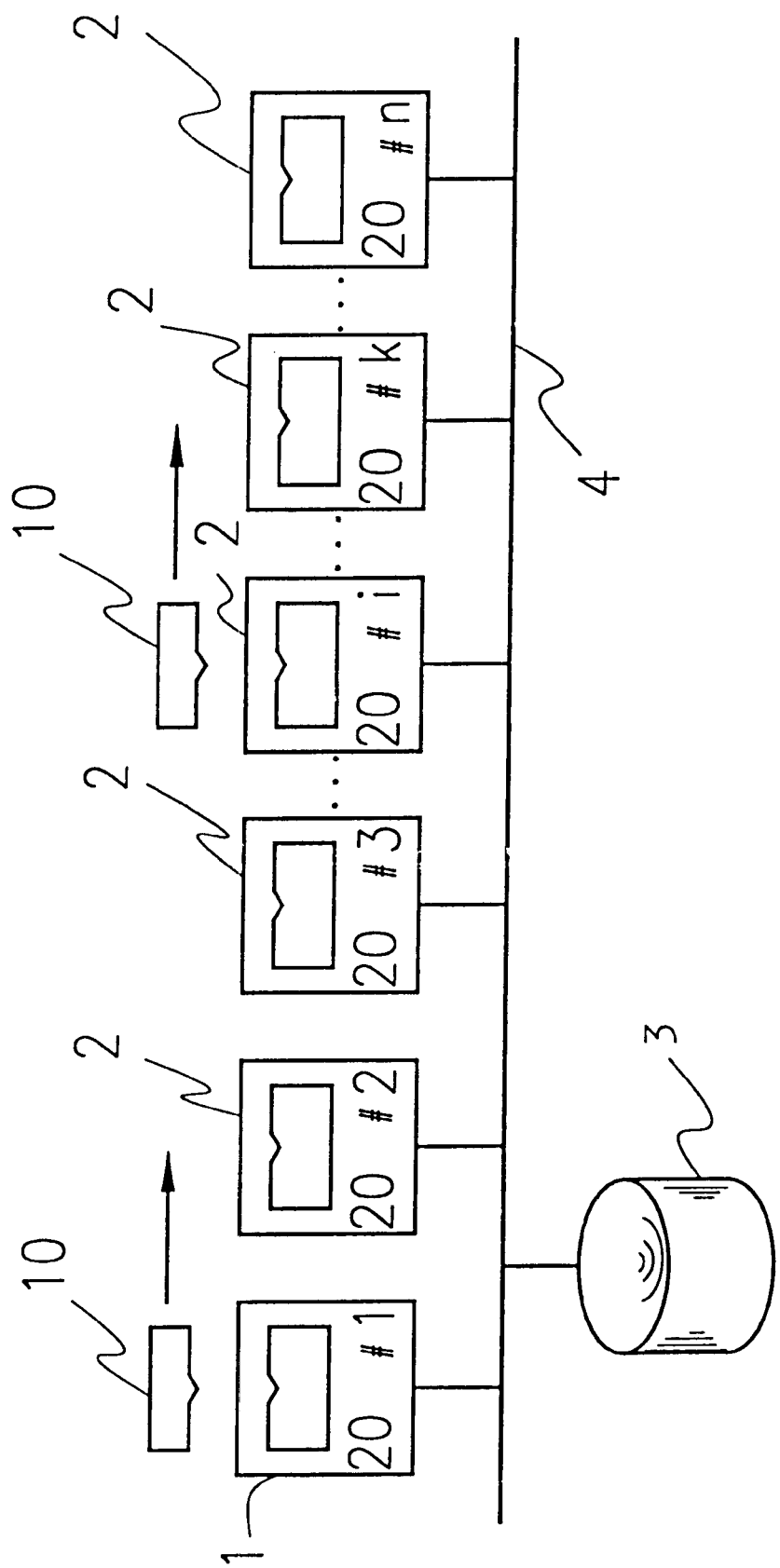
FIG. 1 is a block diagram of the first preferred embodiment of an agent system according to this invention.

FIG. 1 is a block diagram of the first preferred embodiment of an agent system according to this invention.

As is shown in FIG. 1, this embodiment of the agent system consists of agent server 1, a number of communication devices 2, which may be personal computers or work stations, and memory device 3, which stores the source program to generate mobile agents. These components are connected via communication line 4, which may be a cable or cordless system.

Agent server 1 reads out the source program stored in memory device 3 and generates agent 10, which consists of object code. (Because agent 10 moves successively from one communication device 2 to the next, as will be discussed shortly, we shall refer to it as a "mobile agent".)

We shall now discuss the configuration of the agent server.

Figure 2:
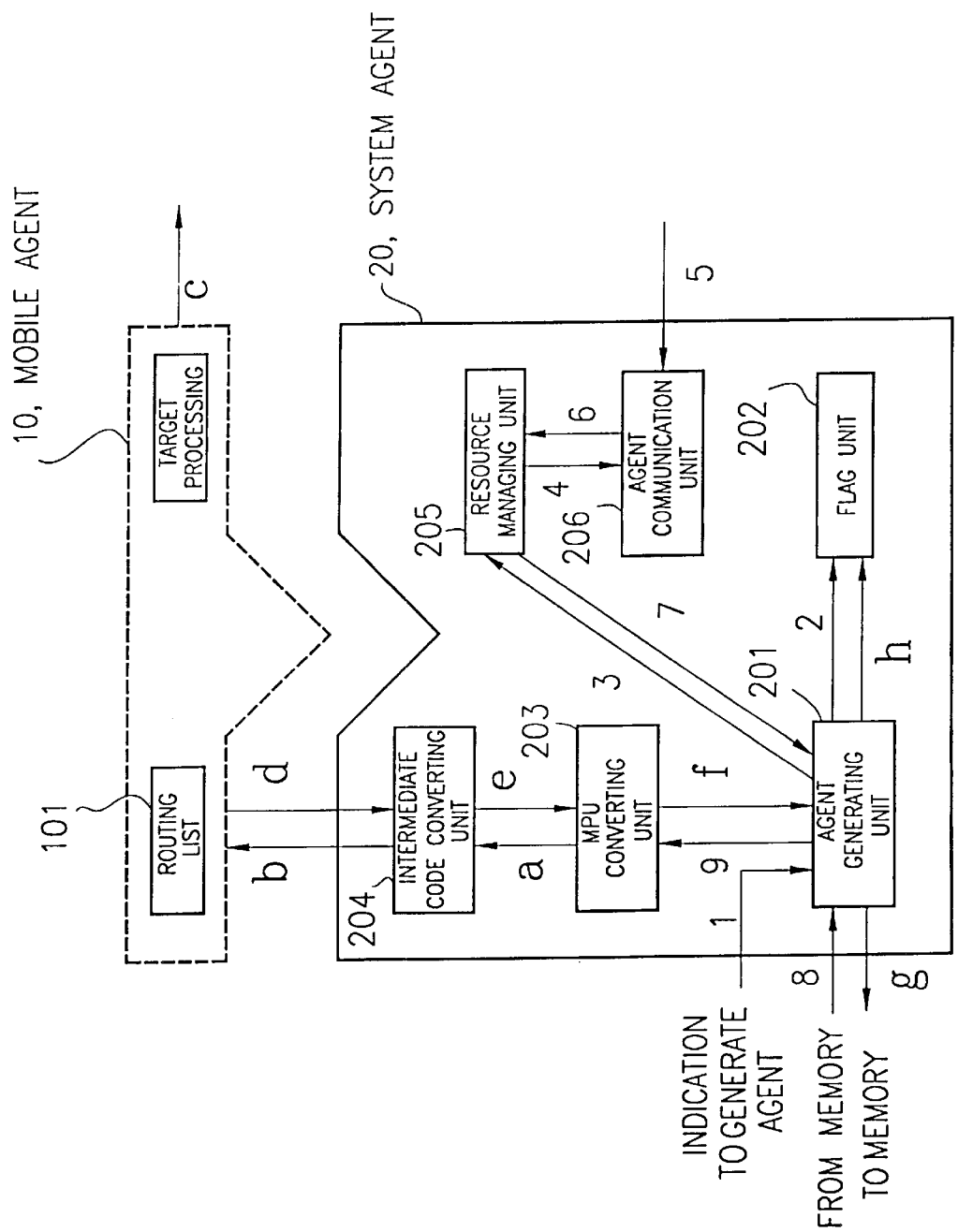
FIG. 2 is a block diagram of a system agent in the agent server shown in FIG. 1.

The agent server 1 described above has its own system agent 20, which can be seen in FIG. 2. This system agent consists of agent generating unit 201, which generates agents; flag unit 202, which houses flags; MPU converting unit 203, which converts MPU code; intermediate code converting unit 204, which converts intermediate code; resource managing unit 205, which manages the resources; and agent communication unit 206, which communicates with other agents.

When agent generating unit 201 receives a command from the control unit (not pictured) to create a certain agent (See (1) in FIG. 2), it sets the "On" flag (=1) in flag unit 2 and locks the resources (See (2) in FIG. 2). It reads out the specified source program stored in memory device 3 and creates an object. It generates mobile agent 10 with its attached routing list 101, to be discussed shortly, which indicates the object's destination, and it stores agent 10 in its memory.

If agent generating unit 201 already has an identical mobile agent 10 in its memory, it will, needless to say, be unnecessary to use the source program to generate another one.

Agent generating unit 201 commands resource managing unit 205 to send a reservation to communication device 2, which is the destination of the mobile agent 10 which has been generated (See (3) in FIG. 2).

When agent generating unit 201 receives a report from resource managing unit 205 indicating that it has made a reservation with device 2 (See (7) in FIG. 2), it reads out the agent 10 which it has generated and stored in its memory (See (8) in FIG. 2) and outputs it to MPU converting unit 203 so that it can be converted to MPU code (See (9) in FIG. 2).

Once mobile agent 10 is transmitted to its destination, communication device 2, agent generating unit 201 sets the "Off" flag (=0) in flag unit 202 to release the resources (See h in FIG. 2).

When MPU converting unit 203 sends mobile agent 10, which it has received from device 2 and converted to MPU code, back to agent generating unit 201 (See f in FIG. 2), agent generating unit 201 converts it back to its original form and stores it in it memory (See g in FIG. 2).

Flag unit 202 contains a flag to indicate whether a foreign system agent 20 will be permitted to use the resources of this device.

If the flag it contains is on (=1), an agent 20 from another system will not be permitted to use the resources of the device; if it is off (=0), it will be permitted to use them.

When MPU converting unit 203 receives mobile agent 10 from agent generating unit 201 (See (9) in FIG. 2), it converts agent 10 to MPU code and outputs it to intermediate code converting unit 204 so that it can be changed to intermediate code (See a in FIG. 2).

When MPU converting unit 203 receives mobile agent 10, which has returned from device 2 and is now in intermediate code, from intermediate code converting unit 204 (See e in FIG. 2), it reconverts it to MPU code and outputs it to agent generating unit 201 (See f in FIG. 2).

Intermediate code converting unit 204 converts mobile agent 10, which it receives in MPU code from MPU converting unit 203, to intermediate code and transmits it to its destination, device 2 (See b and c in FIG. 2).

When intermediate code converting unit 204 receives mobile agent 10 back from device 2 in intermediate code (See d in FIG. 2), it sends it on to MPU converting unit 203 to be put back into MPU code (See e in FIG. 2).

What we are calling "MPU code" is native code, which an ordinary MPU uses as its processing code. What we are calling "intermediate code" is code which can be used as a processing code by both a communication device 2 with an ordinary MPU (not pictured) which uses native code, and by a device 2 such as a JAVA virtual machine, which uses byte code (common code) as its processing code.

Prompted by agent generating unit 201, resource managing unit 205 inquires as to the resource state of the device 2 which is mobile agent 10's destination. If resources are available, it makes a reservation (See (4), (5) and (6) in FIG. 2) and informs agent generating unit 201 of that fact (See (7) in FIG. 2).

Agent communication unit 206 inquires as to the resource state of device 2 by addressing the system agent 20 of that device 2 (See b in FIG. 2).

We shall next explain the mobile agent 10 which is created by agent server 1.

As was discussed above, mobile agent 10 carries, in addition to object code, which allows it to execute in device 2 the specified processing which is its purpose (hereafter called "target processing"), routing list 101. This list consists of routing data indicating the numbers of the nodes in device 2 which the agent must pass through and in whose locations it must execute its processing, and the number of times it is permitted to pass through each node.

Figures 3, 4:
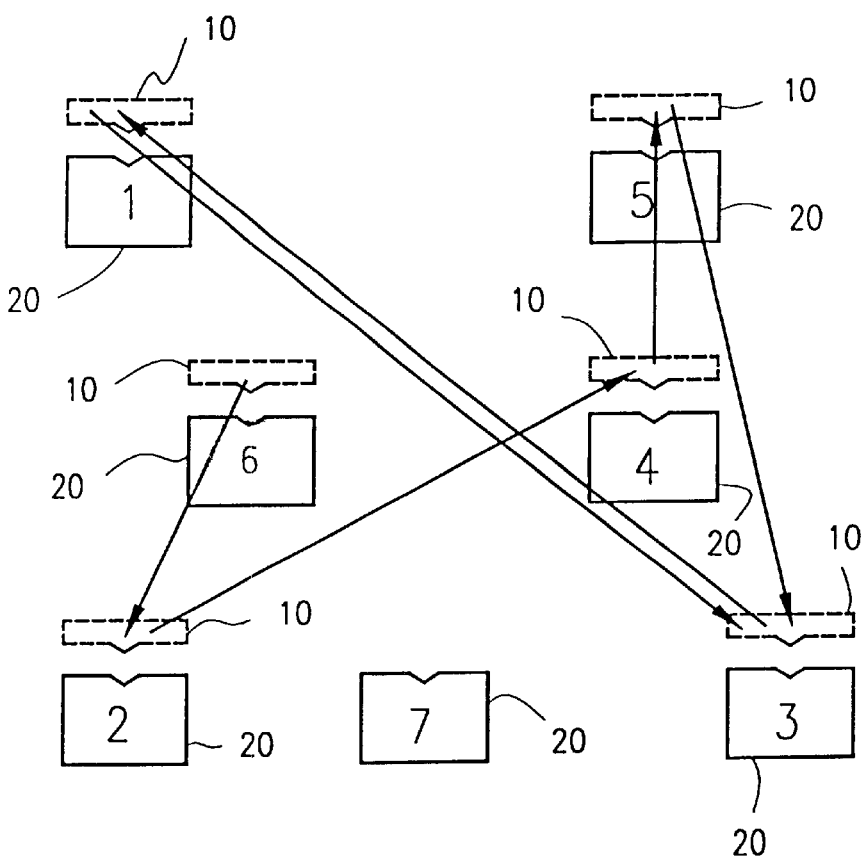
FIG. 3 is a block diagram of a routing list in the mobile agent shown in FIG. 2.
FIG. 4 traces the route of a mobile agent with the routing list shown in FIG. 3.

FIG. 4 traces the route of a mobile agent with the routing list 101 shown in FIG. 3.

Mobile agent 10 first executes its program at the device 2 whose node number is 6. It then executes its program at the device 2 with node number 2, then to 4, and then that with node number 5. It then goes to the device 2 with node number 3, then that with node number 1, and finally back to that with node number 3.

(2) We shall next explain the configuration of the communication devices.

Since most communication device 2 have the same configuration as the agent server 1 described above, we shall omit further detailed discussion. The communication device 2 has a system agent 20, and this system agent comprises consists of agent restoring unit 250, which restores agents; flag unit 202, which houses flags; MPU converting unit 203, which converts MPU code; intermediate code converting unit 204, which converts intermediate code; resource managing unit 205, which manages the resources; and agent communication unit 206, which communicates with other agents.

Figure 5:
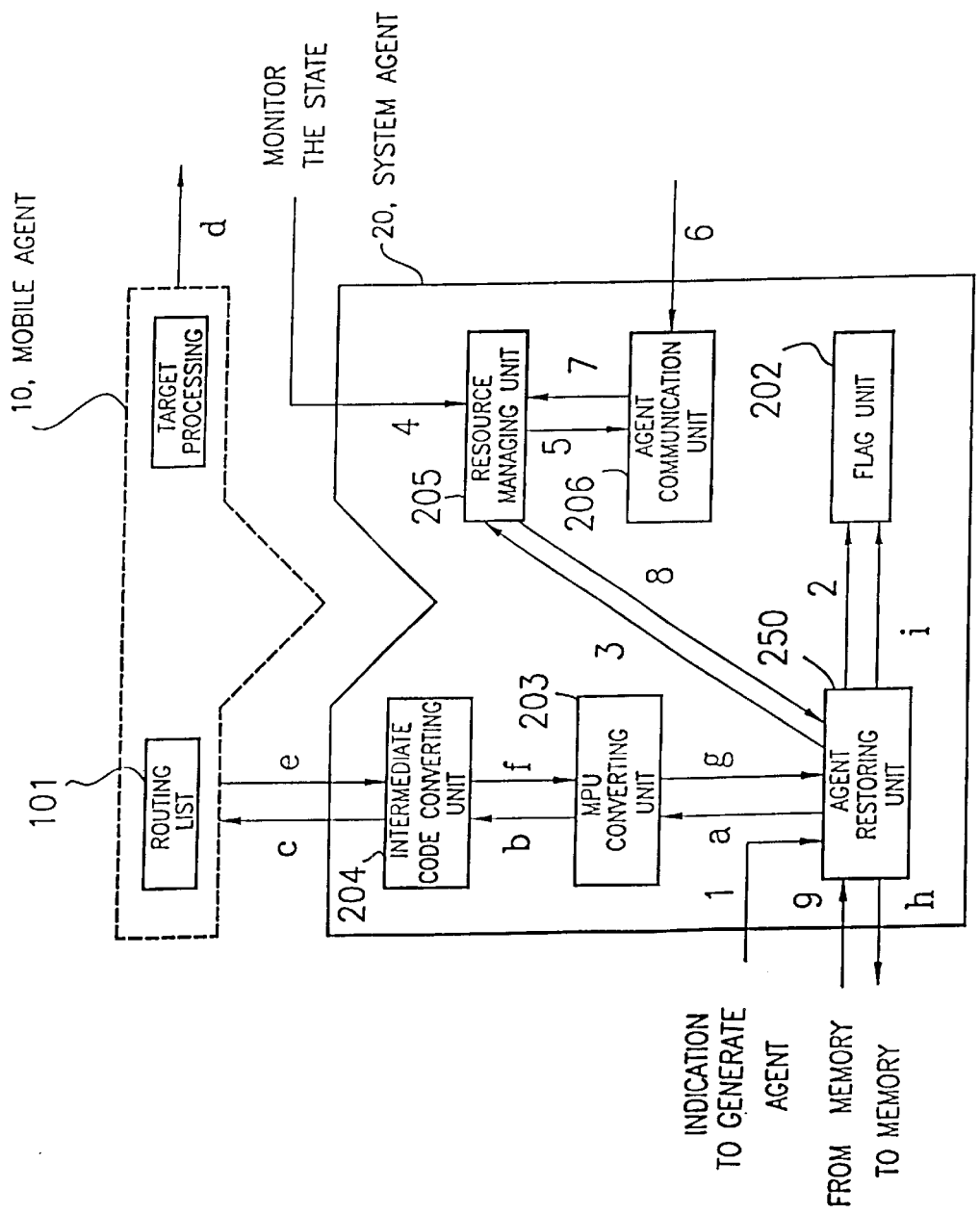
FIG. 5 is a block diagram of the system agent in the communication device shown in FIG. 1.

When agent restoring unit 250 receives a command from the control unit (not pictured) to restore a certain agent (See (1) in FIG. 5), it sets the "On" flag (=1) in flag unit 2 and locks the resources (See (2) in FIG. 5). It reads out the mobile agent which is received previously stored in memory and restores an new mobile agent along with routing list, and it stores the mobile agent in its memory. Agent restoring unit 250 indicates, then, to monitor the processing state of the mobile agent previously received (see (3) in FIG. 5).

When agent restoring unit 250 receives a report from resource managing unit 205 indicating that it has made a reservation with device 2 (See (8) in FIG. 5), it reads out the agent 10 which it has restored and stored in its memory (See (9) in FIG. 5) and outputs it to MPU converting unit 203 so that it can be converted to MPU code (See (a) in FIG. 5).

Other units in system agent of communication device 2 are basically same as the ones in system agent of the agent server 1.

We shall now give a detailed explanation of how the mobile agent is restored by agent restoring unit 250, which was referred above.

If the node which was the source of the mobile agent 10 it receives is on routing list 101, agent restoring unit 250 restores that agent 10 with a list 101 on which 1 has been subtracted from the number of pass permitted to the node the agent has just come from. This transaction takes place in intermediate code, which is the form the agent is in when it arrives from intermediate code converting unit 204.

Figure 6:
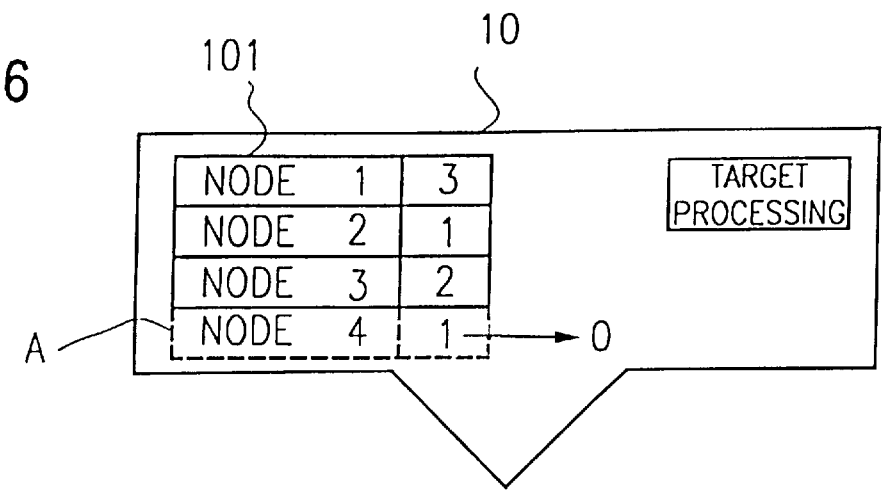
FIG. 6 shows the routing data is deleted in the routing list.

Thus, as is shown by A in FIG. 6, if the mobile agent 10 which was received listed "1" as the number of pass permitted to node 4, it will not need to repass that node, so the next time agent 10 is restored, all the data concerning node 4 will be deleted as unnecessary.

When agent restoring unit 250 receives a command ordering it to send the agent to a node which is not on routing list 101, it restores mobile agent 10 by adding the node number and the number of permitted pass to the routing list 101 which it gets from intermediate code converting unit 204 in intermediate code.

Figure 7A:
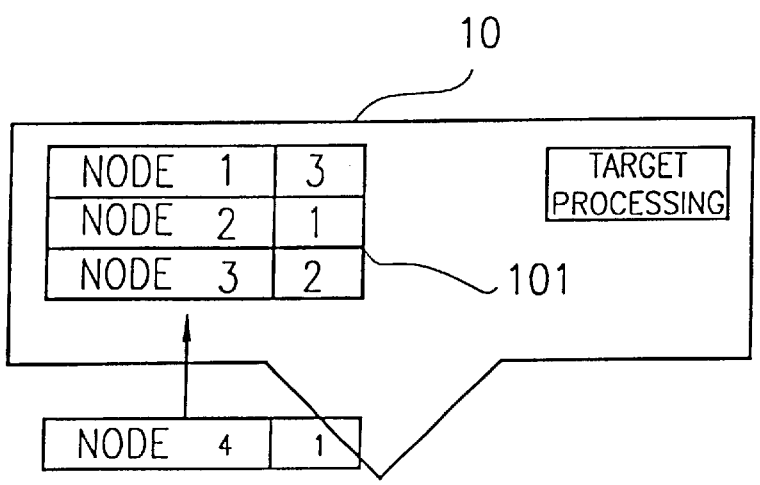
FIG. 7 shows the routing data is added and changed in the routing list.

In the example shown in FIG. 7(a), agent restoring unit 250 restores mobile agent 10 with a routing list 101 which now contains, in addition to its former entries for nodes 1, 2 and 3, an entry for node 4 and its 1 permitted pass.

When agent restoring unit 250 receives an order to change the number of pass permitted to a node which is already on routing list 101, it restores mobile agent 10 by changing the indicated number of permitted pass on the list 101 in intermediate code which it receives from intermediate code converting unit 204.

Figure 7B:
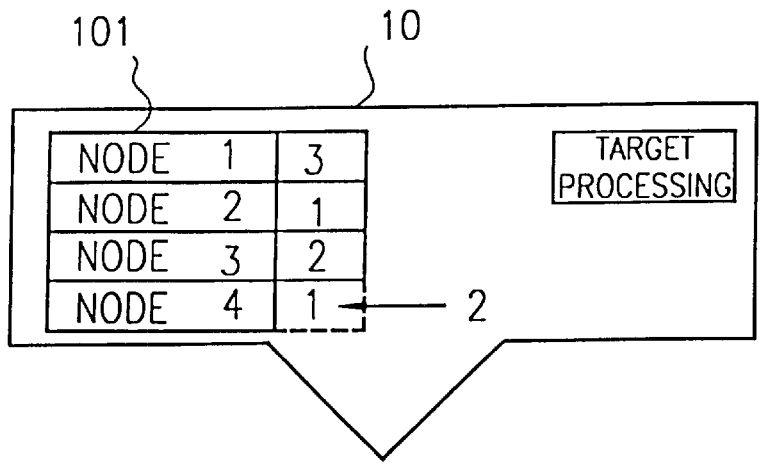

As can be seen in FIG. 7(b), agent restoring unit 250 restores mobile agent 10 with a routing list 101 that now contains, in addition to the existing data for nodes 1, 2 and 3, the new data indicating that node 4, which was formerly permitted one pass, is now permitted two.

Figure 8:
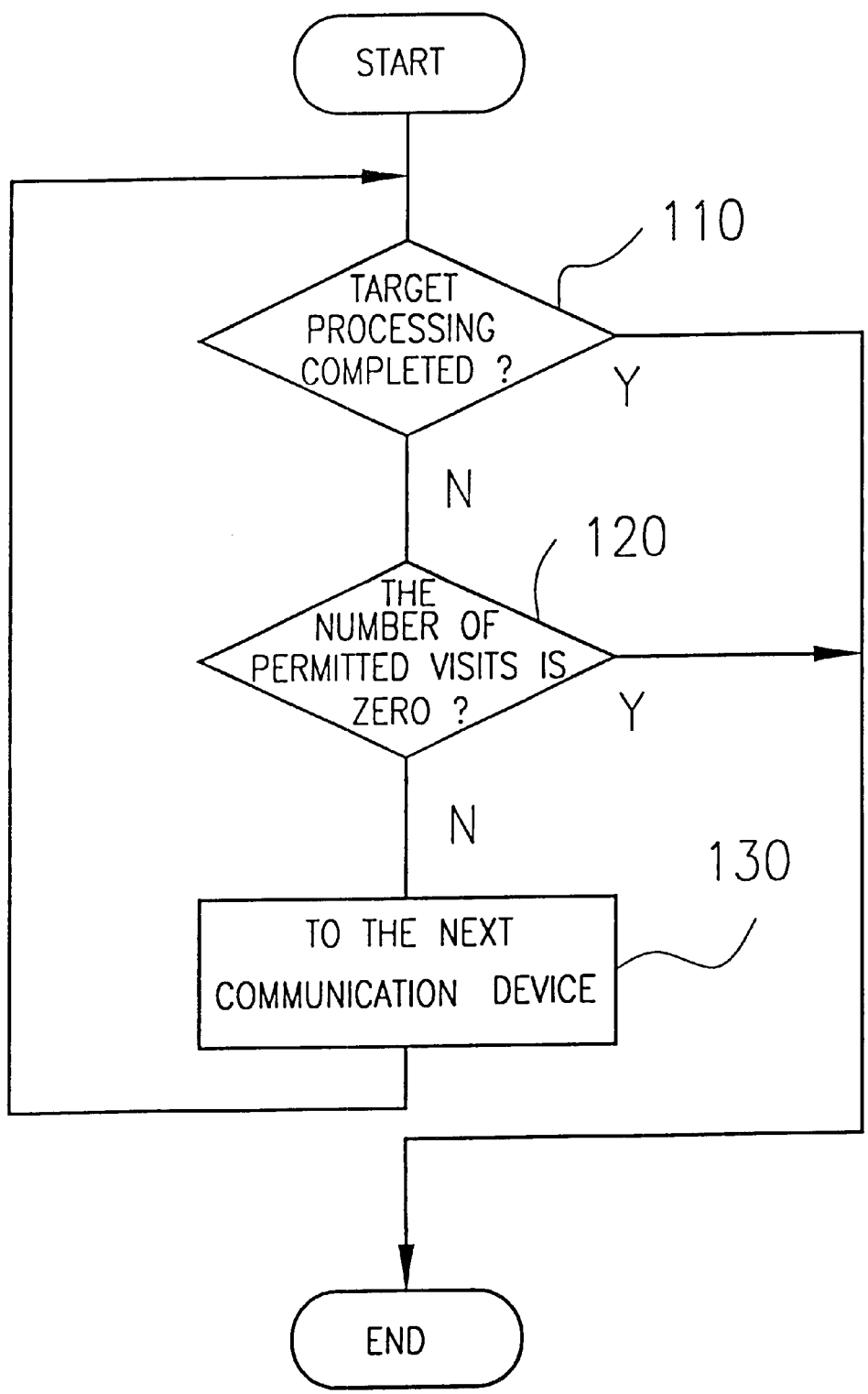
FIG. 8 shows a flow chart of the main processing executed by a system agent in the communication device.
Figure 9:
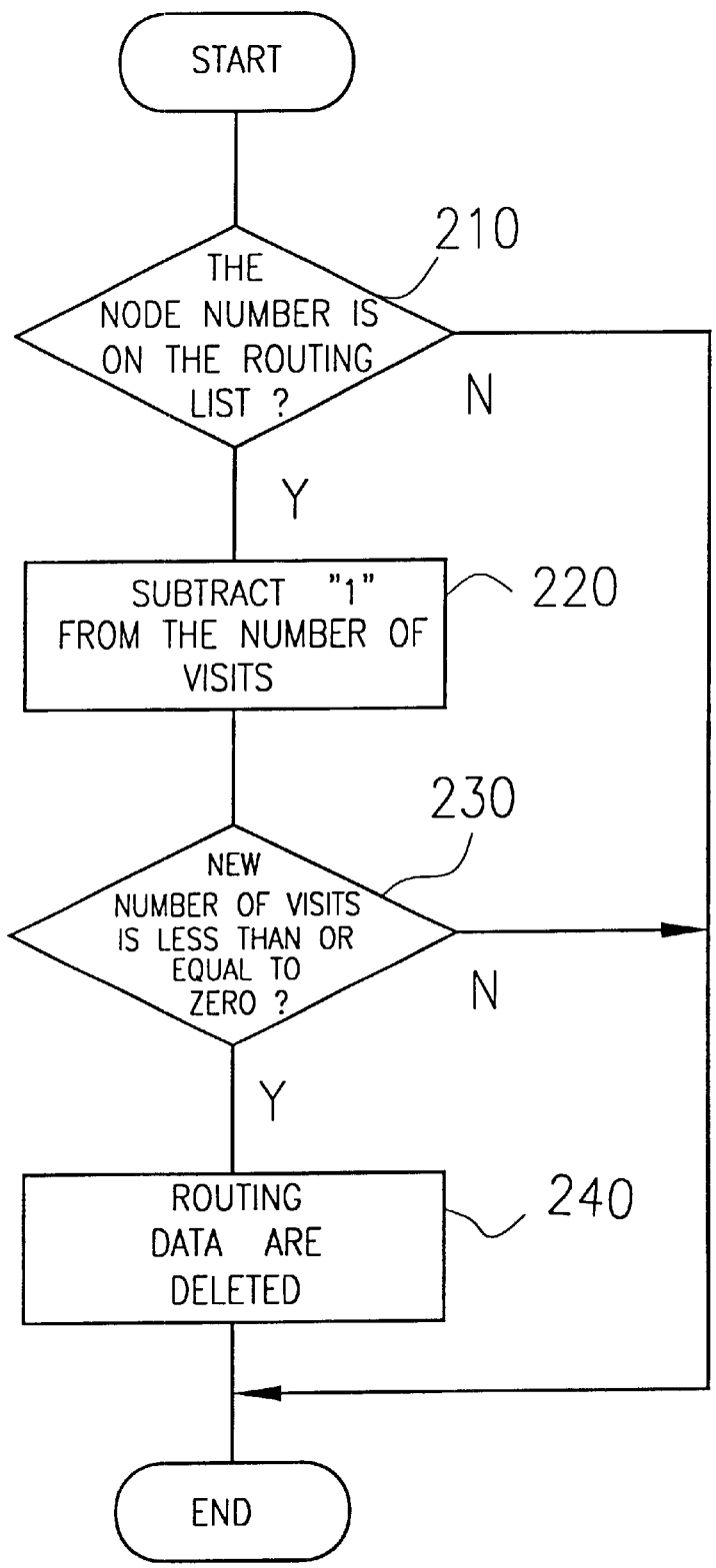
FIG. 9 shows a flow chart to delete the routing data in the routing list.
Figure 10:
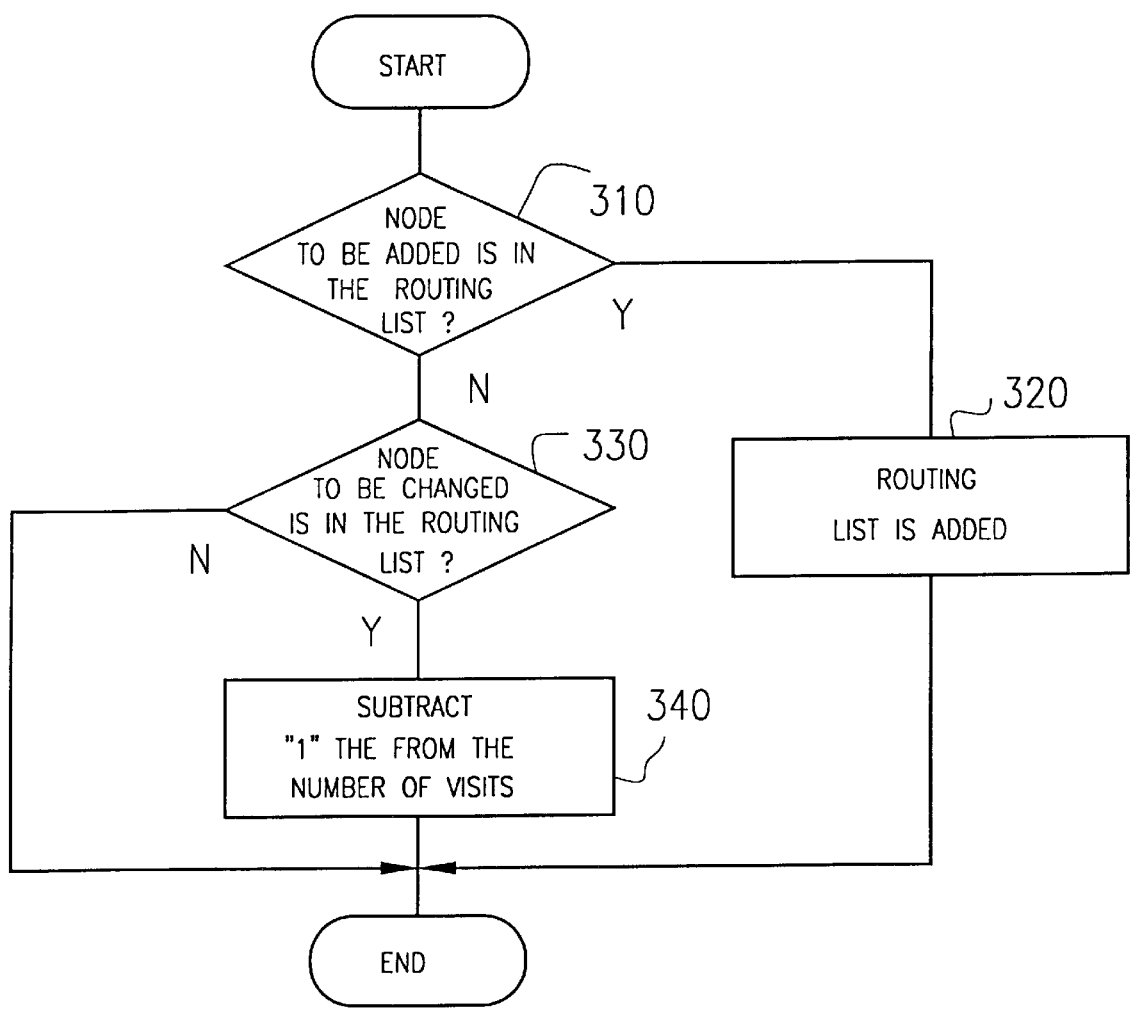
FIG. 10 shows a flow chart to add and change the routing data in the routing list.

Before we explain how this embodiment of an agent system operates when a communication device restores a mobile agent, this restored agent is sent to another machine, and it is stored in that machine's memory, we shall first discuss (i) the main processing executed by a system agent which receives a mobile agent; (ii) the processing a system agent executes to delete data from the routing list; and (iii) the processing a system agent executes to add data to or change the routing list. Please refer to the flow charts in FIGS. 8, 9 and 10.

(I) The main processing executed by a system agent which receives a mobile agent When a communication device 2 receives a mobile agent 10, its system agent 20 executes the agent once it is stored in the memory. It determines whether the target processing has been completed (Step 110). If it has (Step 110: Y), it returns mobile agent 10 to agent server 1 without sending it to the next communication device 2, and completes the processing. If the target processing has not been completed (Step 110: N), it determines whether the number of permitted pass is "0" for every node (Step 120).

If system agent 20 determines that the number of permitted pass is "0" for every node on routing list 101 (Step 120: Y), it sends the mobile agent back to agent server 1 to have its target processing redefined and completes the processing. If the number of permitted pass is not "0"for every node (Step 120: N), it sends mobile agent 10 on to the next communication device indicated on routing list 101 (Step 130). The processing returns to Step 110 and continues as described above.

(ii) Processing executed by the system agent to delete data from the routing list.

To restore a mobile agent 10, the system agent 20 in the communication device 2 which received it reads out the agent 10 from the memory and determines whether the node number in question is on the routing list 101 for that agent (Step 210).

If it determines that the node number is not on the routing list (Step 210: N), system agent 20 completes its deletion processing. If the node number is on the list (Step 210: Y), it writes in the value obtained by subtracting "1" from the number of pass permitted to that node as the new number of pass permitted (Step 220).

System agent 20 determines whether the new number of permitted pass is less than or equal to zero (Step 230). If the result of the determination is that the new number is not less than or equal to zero (Step 230: N), agent 20 completes the deletion processing. If the new number is less than or equal to zero (Step 230: Y), the relevant routing data are deleted (Step 240) and the deletion process is completed.

(iii) Processing the system agent executes to add to or change the data on the routing list.

When system agent 20 restores a mobile agent 10 which its communication device 2 has received, it reads the agent 10 out of the memory and determines whether there is a node which needs to be added to the routing list 101 for that agent (Step 310).

If there is a node which needs to be added (Step 310: Y), system agent 20 adds the data representing that node to the list and completes the processing to add to or change the routing data.

If there is no node which needs to be added (Step 310: N), system agent 20 completes the processing to add to or change the routing data. If it determines that there is a node which needs to be changed (Step 320: Y), it writes in as the number of permitted pass a value obtained by subtracting one from the number of pass permitted to that node (Step 330) and completes the processing to add to or change the routing data.

Figure 11:
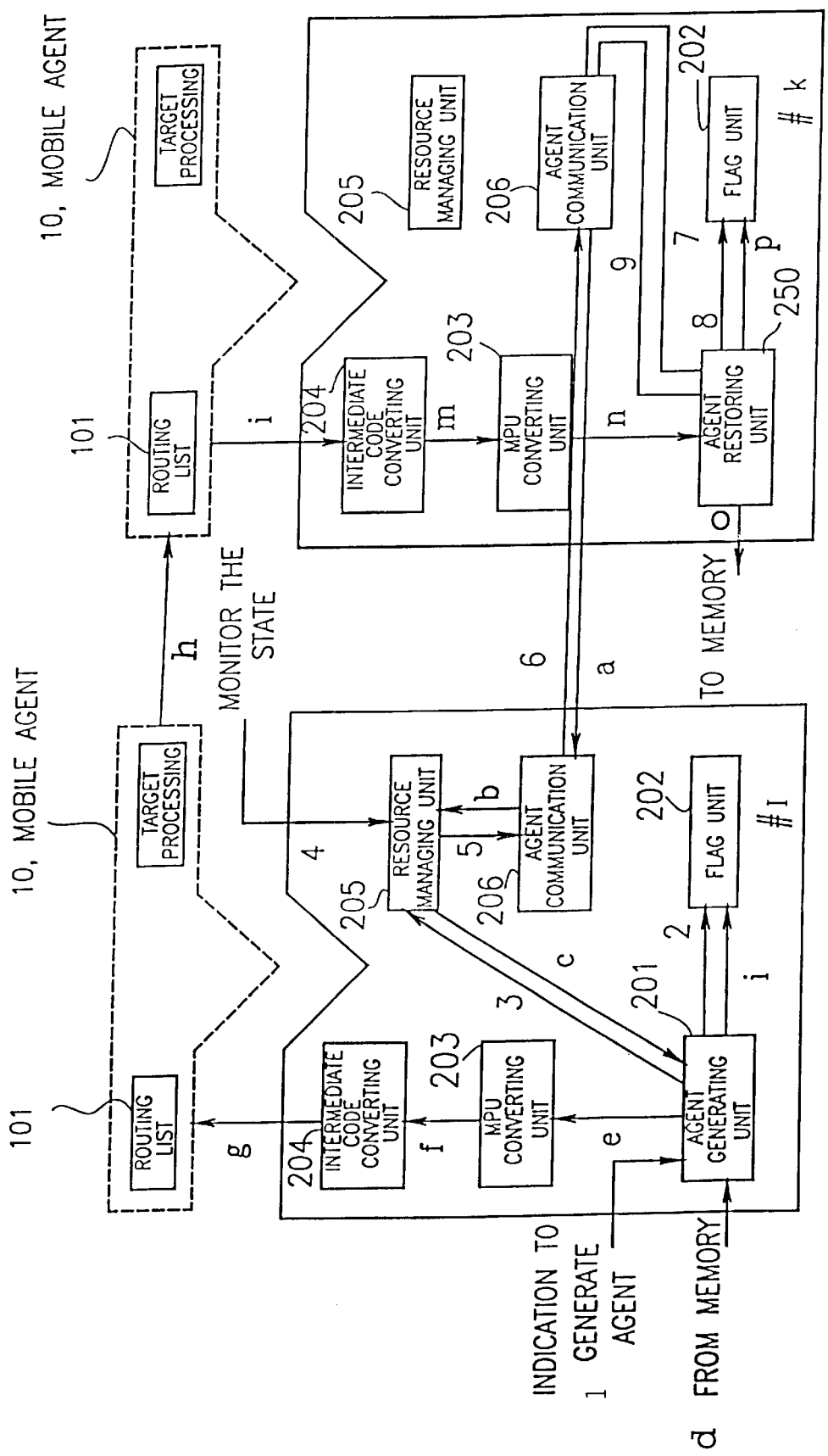
FIG. 11 shows the processing which occurs in the first embodiment of the agent system.

We shall next discuss the operational processing which occurs in this embodiment of an agent system when a communication device restores a mobile agent, sends it on to the next machine and stores it in the memory of that machine, with reference to FIG. 11.

When the system agent 20 for the communication device 2 which is labelled "i" receives, via the control unit, a request from mobile agent 10 to send it on, that is, when it receives from the control unit a command to restore a given agent (See (1) in FIG. 11), agent restoring unit 250 sets the flag in flag unit 202 to "on" (=1) and locks the resources (See (2) in FIG. 11).

Agent restoring unit 250 reads out of the memory the mobile agent 10 which the device has received. It creates a mobile agent with a certain routing list and stores it in the memory, and it outputs to resource managing unit 205 a request to check the the processing state of the received agent 10 (See (3) in FIG. 11).

Resource managing unit 205 checks the processing state of the mobile agent 10 which this device has received (See 4 in FIG. 11). When this agent 10 is to execute processing at a given location, resource managing unit 205 uses agent communication unit 206 to send to whichever device 2 the agent is heading for the amount of memory that agent 10 will need to occupy and a command to reserve an area of the memory big enough to accommodate it (See (5) and (6) in FIG. 11).

When the communication device 2 labelled "k", the agent's destination, receives through its agent communication unit 206 a command to reserve an area of memory of a given size, its agent restoring unit 250 sets the flag in flag unit 202 to "on" (See (8) in FIG. 11) when it has reserved the requested amount of memory. It then informs the resource managing unit 205 in communication device "I", via the respective communication units 206, that the resources are now reserved (See (6) a and b in FIG. 11).

If the agent restoring unit 250 in device "k", the agent's destination, is unable to reserve the required memory, it leaves the flag in flag unit 202 set on "off" and informs the resource managing unit 205 in device "I", via the respective communication units 206, that it is unable to reserve the resources (See (6) a and b in FIG. 11).

When the resource managing unit 205 in device "I" receives the message that the reservation has been completed, it informs the agent restoring unit (See c in FIG. 11.)

When agent restoring unit 250 receives this information, it reads out of the memory the mobile agent 10 which it previously generated and stored (See d in FIG. 11), and it sends this agent to MPU converting unit 203 (See e in FIG. 11).

When MPU converting unit 203 receives this mobile agent 10 from agent restoring unit 250 (See e in FIG. 11), it converts it to MPU code and outputs it to intermediate code converter 204 (See f in FIG. 11).

Intermediate code converting unit 204 converts the mobile agent 10 from MPU code to intermediate code and transmits it to its destination, communication device "k" (See g and h in FIG. 11).

When device "k" receives from device "I" the same mobile agent 10, which now consists of intermediate code, its intermediate code converting unit 204 outputs the agent to MPU code converter 203 (See l and m in FIG. 11).

When MPU converting unit 203 receives the agent in intermediate code from intermediate code converting unit 204 (See m in FIG. 11), it reconverts it to MPU code and outputs it to agent restoring unit 250 (See n in FIG. 11).

When agent restoring unit 250 receives mobile agent 10, now in MPU code, from MPU converting unit 203 (See n in FIG. 11), it changes it back to its original form and stores it in the memory (See o in FIG. 11).

Agent restoring unit 250 then outputs to flag unit 202, whose resources must be released, a command to set the flag to "off" (See p in FIG. 11), which transfers the authority to execute programs to the control unit.

Since the processing operations entailed when agent server 1 creates a mobile agent, sends this agent 10 to another communication device, and stores it in that device's memory are the same as those used for the restored mobile agent 10 described above, we shall omit further discussion.

<Second Preferred Embodiment>

Figure 12:
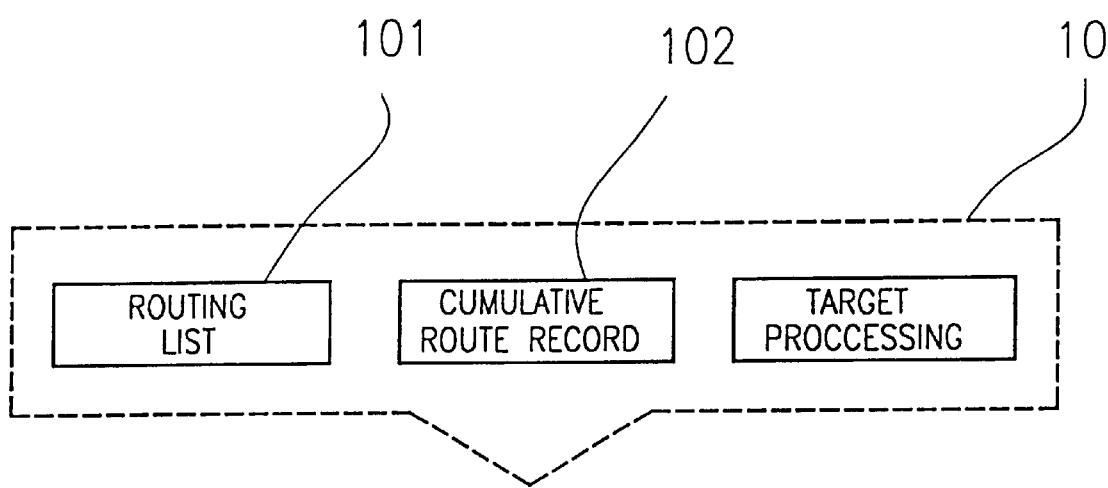
FIG. 12 shows a block diagram of a mobile agent generated or restored according to the second preferred embodiment.

FIG. 12 is a block diagram of a mobile agent restored by communication device 2.

In the first embodiment of the agent system, system agent 20 would restore a mobile agent 10 consisting of a routing list 101 and target processing, as described above. In the second embodiment of this system, system agent 20 restores a mobile agent 10 with an additional item, a cumulative route record which traces its course through the nodes of communication device 2.

Since the system agent 20 for each communication device 2 has access to the cumulative route record in every mobile agent 10, it can determine which is the quickest route to device 2, the destination.

The time it takes each mobile agent 10 to reach its destination will vary because system agent 20 will have a different processing capacity at each node. It is not necessarily the case that the route with the smallest number of nodes will prove to be the quickest.

Figure 13:
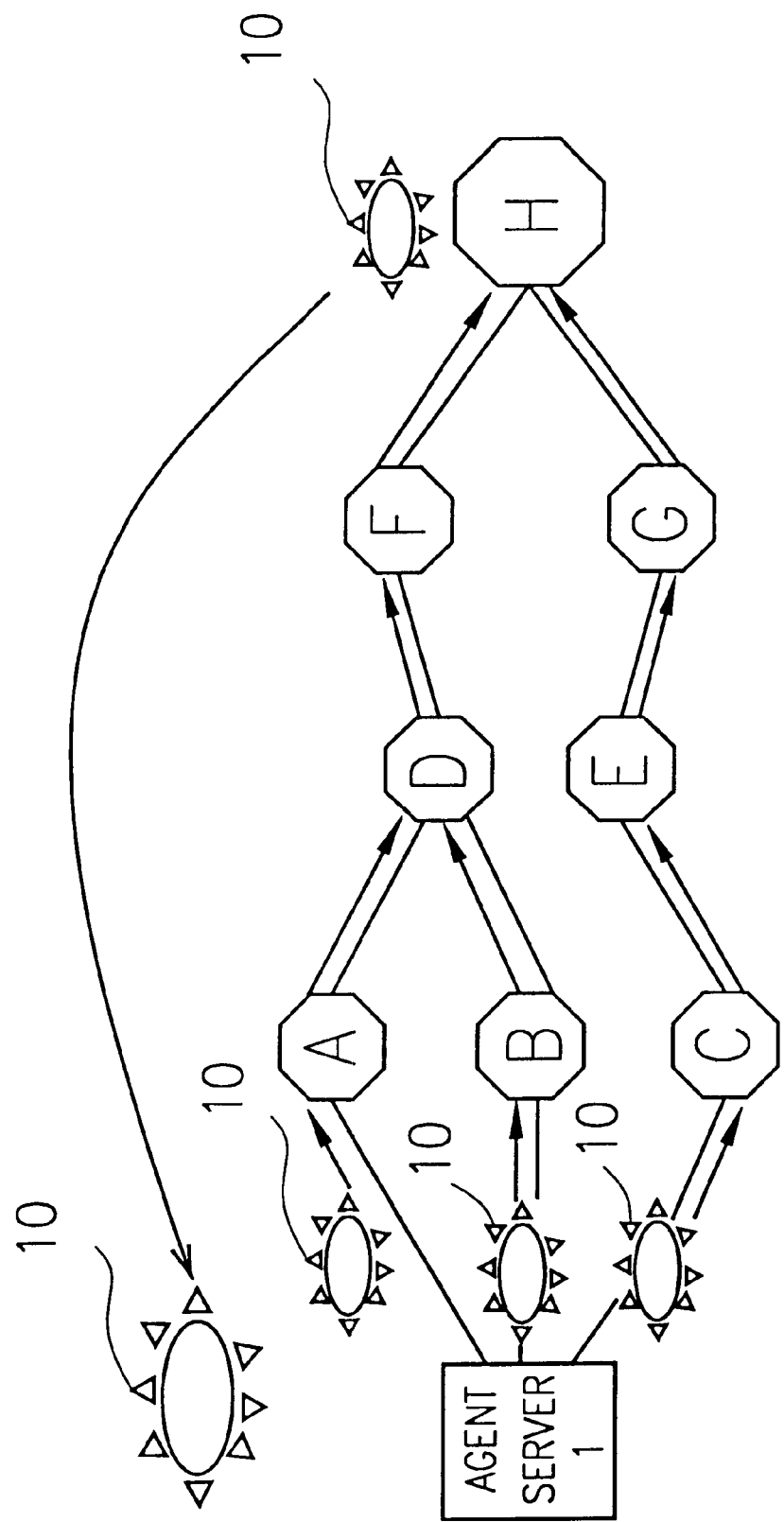
FIG. 13 shows the processing to determine the shortest route for the mobile agent.
Figure 14:
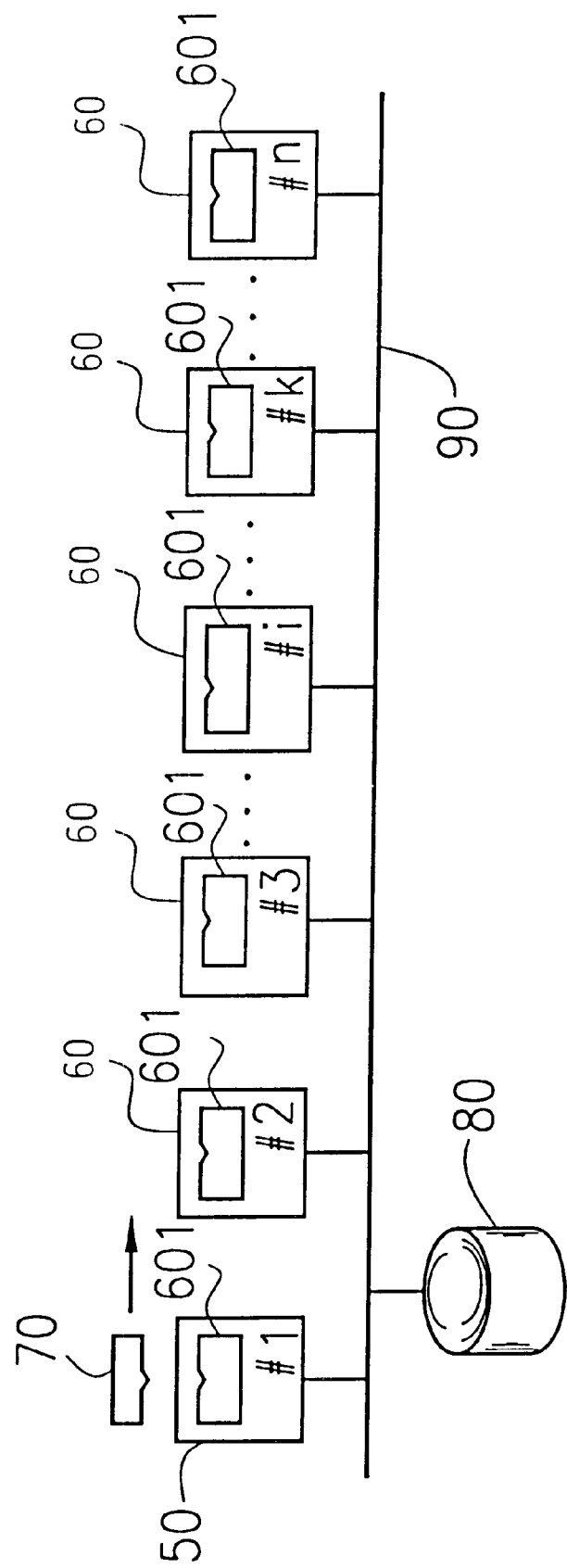
FIG. 14 shows a typical agent system of a prior art.
Figure 15:
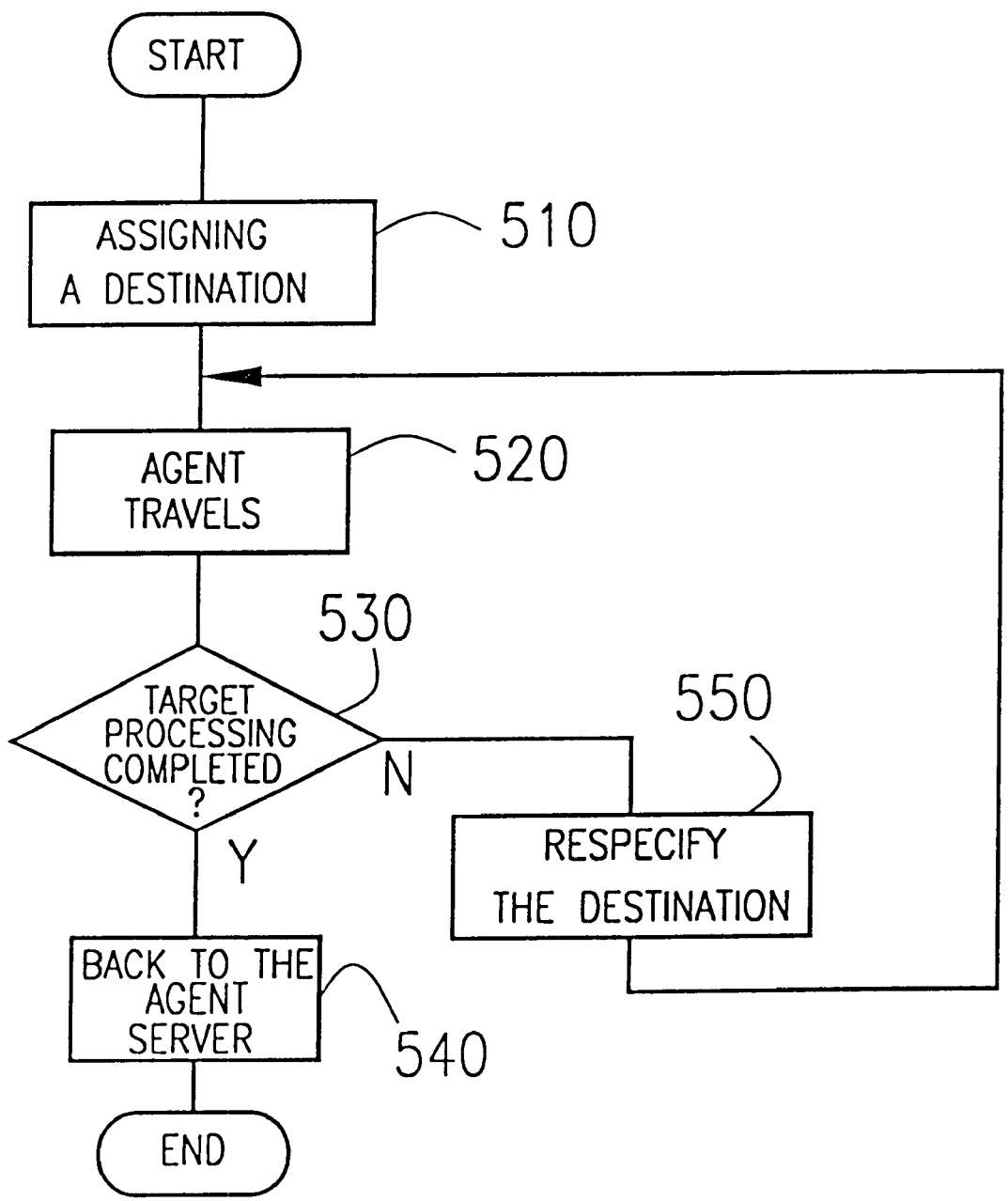
FIG. 15 shows a flow chart for transmitting an agent of a prior art.
Figure 16:
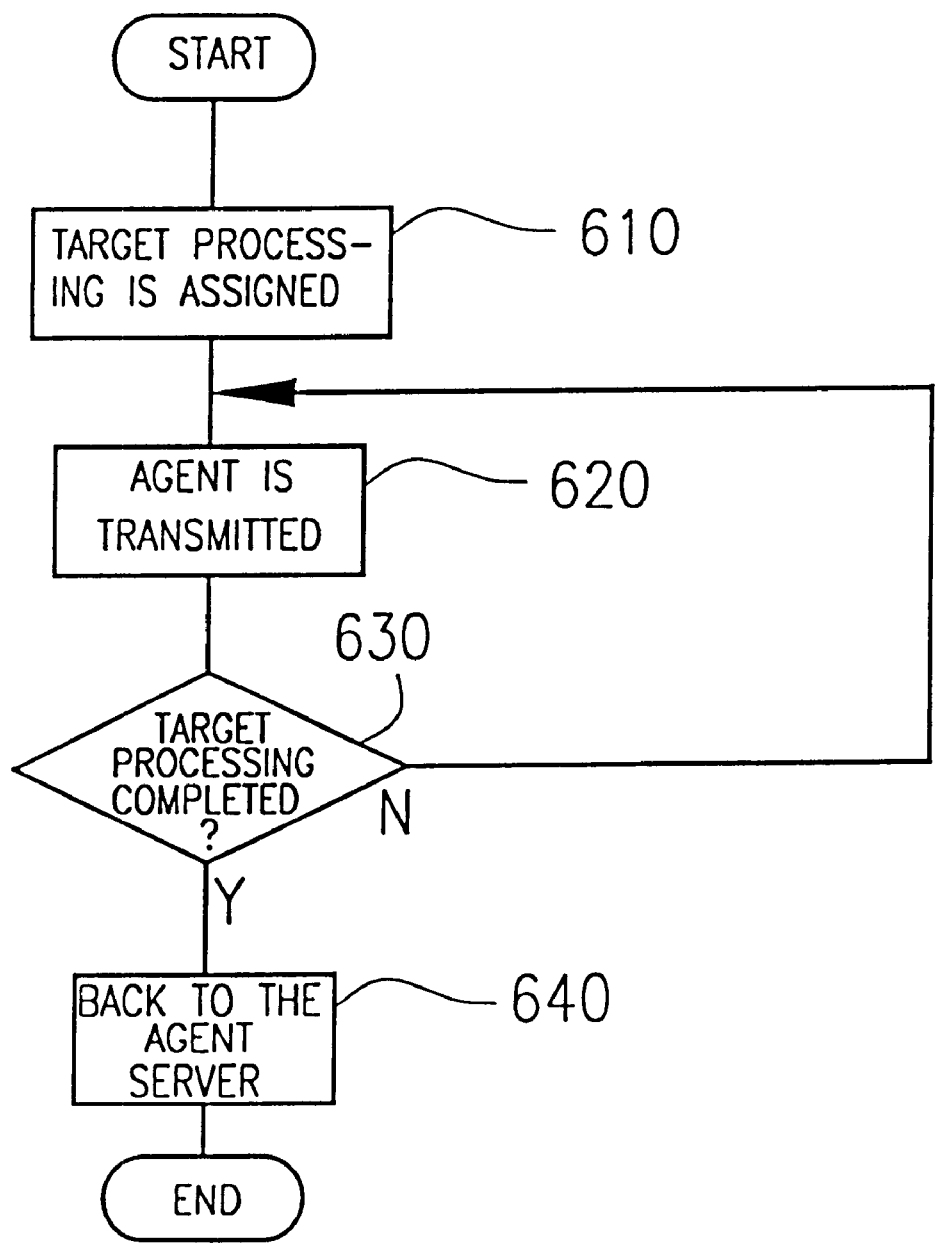
FIG. 16 shows a flow chart for transmitting an agent of a prior art.
Figure 17:
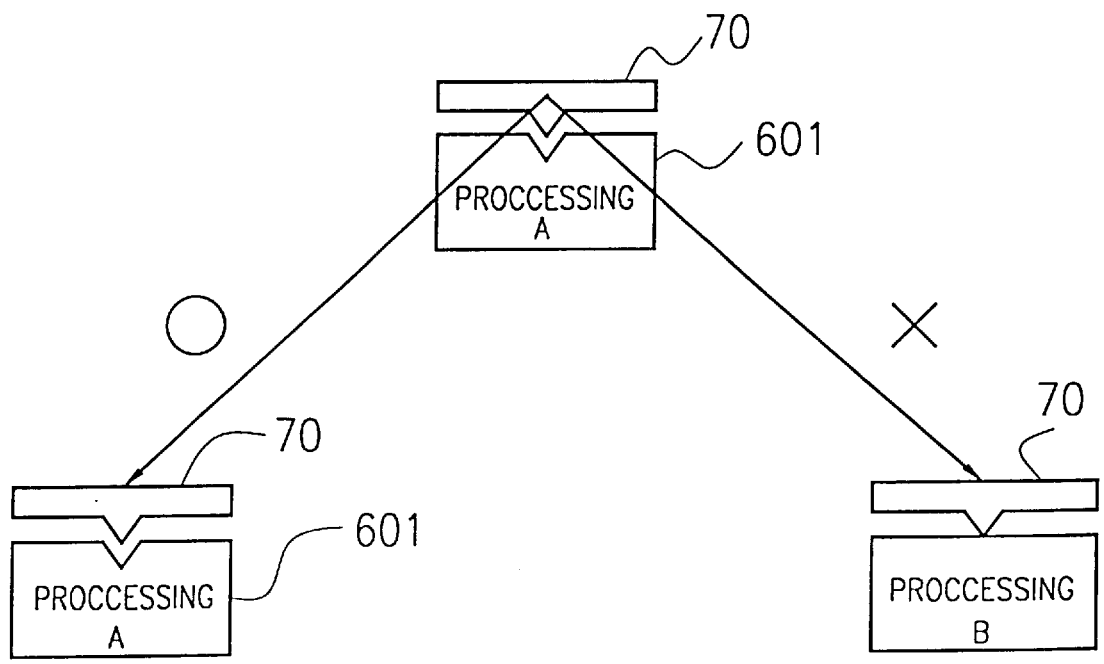
FIG. 17 shows it is unable to execute the received agent when the communications use different systems.

We shall next explain the processing to determine the shortest route for the mobile agent, with reference to FIG. 13.

Let us assume that agent server 1 launches three mobile agents 10 simultaneously. The routing list 101 for the first agent specifies nodes A, D and F as the route and node H as the destination. This first agent is supposed to cause the system agent 20 which is transmitted to execute certain processing (i.e., its task). The list for the second agent specifies nodes B, D and F as the route and node H as the destination. The list for the third agent specifies nodes C, E and G as the route and node H as the destination.

If the second agent 10 is the first to arrive at node H, the system agent 20 for the device 2 at node H will set the flag in flag unit 202 to "on" to indicate that a route has been selected. The mobile agent 10 with that particular cumulative route record (i.e., those particular cumulative route data) will be restored and returned to agent server 1.

By looking at mobile agent 10's cumulative route record 102, agent server 1 determines the quickest route to the destination. It then destroys the mobile agent 10 which acted as a scout.

From then on, whenever node H is mobile agent 10's destination, agent server 1 creates a routing list 101 based on the cumulative route record 102 which it already has.

Thereafter, when the system agent 20 at node H receives a mobile agent and realizes that the "route selected" flag is on, it will destroy the newly arrived agent 10 instead of returning it to the server.

Effects Of The Invention

With this invention, the communication devices restore the agents which they receive with changed routing data as needed. This eliminates the need to respecify destinations.

Because the communication devices reserve an area of memory for its storage in whatever device the restored agent is about to be sent to, restored agents can be transmitted reliably to their destinations.

Because the communication devices convert the agent to an intermediate code before transmitting it, agents can be transmitted between devices using different processing systems.

With this invention, an agent acquires cumulative route data when it is restored. Thus when it is to be transmitted to another device, cumulative route data from the agent server through its destination device can be obtained.

Thus by simultaneously sending out a number of agents, the server can discover the quickest route to the destination from the cumulative route data of the first agent to arrive.

What is claimed is:

1. An agent system comprising:
   an agent server;
   a plurality of communication devices;
   a communications system for coupling said agent server and plurality of communications devices;
   an agent containing routing data which is generated by said agent server and travels over said communication system in accordance with said routing data;
   each of said communication devices comprising a restore and transmit section for restoring an agent received over said communications system and transmitting a restored agent over said communication system, said restore and transmit section determining if said routing data of a received agent requires modification based upon predetermined criteria and further can modify said routing data in accordance with information contained in the agent and predetermined instructions in the restore and transmit section;
   said routing data comprising at least one agent destination node identification data and a pass data associated with said node data; and
   said restore and transit section modifying said pass data to indicate processing is complete at a destination based at least upon said restore and transmit section determination that routing data of a received agent requires modification.

2. An agent of claim 1 wherein the routing data comprises at least one agent destination and agent routing control information which the restore and transmit section uses to determine if the agent will or will not be sent to a destination.

3. An agent system comprising:
   an agent server;
   a plurality of communication devices connected through a communication system to said server;
   an agent with agent destination routing data, specified target processing for each specified destination and destination processing completion data, said agent being generated by said server and traveling among said communication devices via said communication system according to said routing data;
   each of said communication device comprising a restore and transmit section which reads said routing data and determines the next destination said agent will be sent based upon said routing data, said restore and transmit section modifying said routing data and processing completion data based at least upon whether specified processing has been completed as indicated in said routing data and instructions in the restore and transmit section; and
   said communication device and said agent server further comprising a memory area reserving section for reserving a memory area in a destination communication device for said agent prior to sending said agent to said destination communication device according to said routing data.

4. An agent system of claim 1 or 3 wherein the communication device further comprises an agent code converting unit which converts an agent code to an intermediate code which a destination communication device can process and then transmits said intermediate code to said destination communication device.

5. An agent system of claim 1 wherein said communication device further comprises a memory area reserving section for reserving a memory area in a destination communication device for said agent prior to sending said agent to said destination communication device according to said routing data.

6. An agent system of claim 1 wherein said pass data further comprises data which indicates the number of times an agent may pass through a node, said restore and transmit section subtracting 1 from said pass data to indicate processing is complete at a node or adding 1 to said pass data to indicate the agent must be sent to a node when said restore and transmit section determines processing has not been completed at a node based at least upon said routing data.

7. An agent system of claim 1 wherein said restore and transmit section deletes a destination node identification data of a communication device listed in said routing data in said agent when said pass data is set to zero.

8. An agent system of claim 7 wherein said restore and transmit section adds new destination communication device node data to said routing data.

9. An agent system of claim 1 wherein said restore and transmit section may change the routing data to increase or decrease the number of times an agent may pass through a destination communication device node listed in said routing data.

10. An agent system of claim 9 wherein said agent further comprises a cumulative route record for recording communication device identification node data from nodes which said agent previously passed through.

11. An agent system of claim 10 wherein said restore and transmit section can modify said cumulative route record when said agent's routing data is modified.

12. An agent system of claim 3 or 5 wherein said memory area reserving section further comprises a current state detection unit which monitors processing progress of an agent which has been received and said memory reserving section reserves a memory in a destination communication device when said detection unit determines that said agent has completed processing.

13. An agent system of claim 10 or 11 wherein said agent server simultaneously transmits a plurality of agents having different routing data sequences to a final communication device, said data having a final destination node, said server then reads out said cumulative route record from said agent which has returned, said final communication device send back to said agent server only an agent which was the first to arrive to said final communication device.

14. A mobile agent system comprising:

an agent server;

a plurality of communication devices connected to the agent server via at least one communication system;

an agent comprising routing data initially generated by said agent server, said agent traveling among at least some of said communication devices via said communication system according to said routing data, said routing data comprising:

a routing list of nodes where predetermined processing is to be accomplished;

processing completion data indicating whether or not said processing has been completed at a listed node;

each said communication device further comprising a restoring and transmitting section which can identify destination nodes in said routing data that said agent has or has not previously performed said processing and modifying routing data to indicate completion of said processing when said restoring and transmitting section determines a listed node's processing has been completed, said restoring and transmitting section also modifying routing data to indicate predetermined processing has not been completed when said restoring section determines required processing for a node is not complete; and said restoring and transmitting section executing predetermined instructions in response to said modifications to said routing list.

15. A mobile agent system as in claim 14 wherein the agent server simultaneously sends a plurality of said agents with the same target processing through said communication system wherein each of said agent's routing data has differently ordered destination nodes; and each of said agents further comprising a cumulative routing data which indicates the actual route taken by the agent as specified in the agent's routing data, said cumulative routing data indicating one of the agent's routing data's destination node identification data as a final destination node;

said communication devices further comprising a section within the restoring and transmitting section which can modify said cumulative routing data to indicate the actual routing path the agent traversed by the agent among the communication devices;

a section within each said communication device's restoring and transmitting section which routes the agent first arriving at said final destination node back to the server when all processing specified in said agent and routing specified in the agent's routing list have been accomplished, said final destination node deleting the remainder of said plurality of agents upon arrival at said final destination node; and said server further comprising a cumulative routing list within the server which comprises the cumulative routing list of said first arriving agent upon return to the server.

16. An agent system comprising:

at least one communication device;

an agent server coupled to said at least one communications device through a communications system, said agent server generating an agent which travels over said communications system to said at least one communications device in accordance with routing information within said agent;

each said communications device inspecting routing information in a received agent and determining if said routing information must be modified based upon predetermined criteria and, if so, modifying said routing information in said agent and retransmitting said agent over said communications system; and each of said communications devices modifying said routing data based at least upon whether specified processing has been completed to indicate that processing has been completed at an agent destination.

17. A mobile agent system comprising:

a communication device connected to at least one other communication device as well as at least one agent server through at least one communication system, said communication device comprising:

a mobile agent control section;

at least one agent transfer data list initially generated by an agent server control section used by the mobile agent control section to control transfer of said agent to a destination, said transfer data comprising:

a transfer event list identifying destination nodes where predetermined processing is to be accomplished; and predetermined processing completion data indicating whether or not said processing has been completed at a listed node;

said control section further comprises a section which can identify destination nodes in said transfer data that said event processing section has or has not previously performed said processing, said transmitting section modifying transfer data to indicate completion of said processing when said restoring section determines a listed node's processing has been completed, said restoring section also modifying said transfer data to indicate predetermined processing has not been completed when said restoring section determines required processing for a node is not complete; and said control section executing predetermined instructions in response to said modifications to said transfer data.

18. A method of processing a mobile agent by a communication device comprising:

receiving a reservation request for a mobile agent;

determining if said communication device can receive and execute said mobile agent;

sending a message to a sending communication device or agent server indicating that a receiving communication device can receive and execute a mobile agent;

receiving and storing a mobile agent in memory;

reading the agent's routing data;

determining if one or more destination nodes within said routing data must be modified based upon predetermined criteria by a restore and transmit section within said communication device;

modifying the routing data if the determination indicates routing data modification is required;

performing processing specified by the agent and predetermined criteria; and modifying said routing data to indicate that processing specified for the communication device within which the agent is residing has been completed.

19. A method of claim 18 wherein the routing data modification comprises deletion of a destination node which has been visited by the agent and in which all specified processing has been completed.

20. A method of claim 18 further comprising:

determining the next routing destination for the agent;

sending a memory reservation request to a destination communication device specified in the routing data unless routing data indicates the agent should not be sent to another destination communication device; and transmitting the agent to a destination communication device node specified in the routing data when a memory reservation has been made by the receiving device.

21. A method of claim 20 further comprising:

routing the agent back to an agent server when all processing and routing specified in the agent's routing list have been accomplished; and the server reading the agent's routing list; and creating a cumulative routing list within the server which comprises a list of communication device nodes recorded in the agent's routing list upon return to the server.

22. A method of claim 18 further comprising:

converting the agent code into intermediate code prior to transmitting said agent to a destination communication device.

23. A method of claim 18 wherein agent routing data further comprises final destination routing sequence control data.

24. A method of claim 18 or 23 further comprising creating a cumulative route record within an agent using the routing data; and modifying the cumulative route record when the agent's routing data is modified.

25. A method of claim 24 wherein the initial specifying routing data by the server is accomplished by reading and copying routing data from a cumulative routing list which is created and updated with routing data from agent routing lists found in agents that have returned to an agent server.

26. A method of claim 25 further comprising sending by an agent server a plurality of agents to destinations specified in the routing data through a communication system, each agent comprising the same specified processing and destinations and wherein destination nodes in each agent's routing data is differently ordered but with the same final destination node; and routing the first agent received by the final destination node specified in the routing data back to a server when an agent has completed all specified processing as indicated by said routing data and agent processing completion data.

27. A method of claim 26 further comprising deleting the remainder of the plurality of agents with the same specified processing and destinations which arrive at the common final destination node specified in the plurality of agents' routing data after the first of the plurality of agents arrive and complete specified processing.

28. An agent system comprising:

an agent server;

a plurality of communication devices;

communications system for coupling said agent server and plurality of communications devices;

an agent comprising routing data which is generated by said agent server and travels over said communication system in accordance with said routing data;

each of said communication devices comprising a restore and transmit section for restoring a received agent over said communications system and transmitting a restored agent over said communication system, said restore and transmit section determining if said routing data of a received agent requires modification based upon predetermined criteria and further being capable of modifying said routing data in accordance with information contained in the agent and predetermined instructions in the restore and transmit section;

said agent further comprising data associated with processing specified for a node in the routing data; and said restore and transmit section further being capable of deleting data associated with processing within said agent when said data is no longer needed based upon at least the restore and transmit section determination the routing data requires modification.

29. An agent system comprising:

an agent server;

a plurality of communication devices;

a communications system for coupling said agent server and plurality of communications devices;

an agent containing routing data which is generated by said agent server and travels over said communication system in accordance with said routing data;

each of said communication devices comprising an agent routing and control section for preparing a received agent for sending over said communication system as well as sending said agent over said communication system;

said routing and control section determining if said routing data of a received agent requires modification based at least upon a determination that agent processing is complete at a current agent destination;

said routing and control section deleting data or stored information within the agent associated with completed processing if said data or stored information is not needed for future processing; and said routing and control section further performing modification of said routing data in accordance with said determination that agent routing data requires modification.

30. An agent system of claim 29 wherein said routing data comprises at least one agent destination node identification data and a routing control data associated with said node data, and wherein said routing and control section modification of said routing data comprises modifying said routing control data to indicate processing is complete at a current agent destination.

* * * * *

UNITED STATES PATENT AND TRADEMARK OFFICE
CERTIFICATE OF CORRECTION

PATENT NO. : 6,473,761 B1  Page 1 of 1
DATED : October 29, 2002
INVENTOR(S) : Yutsuka Shigemori et al.

It is certified that error appears in the above-identified patent and that said Letters Patent is hereby corrected as shown below:

<u>Title page,</u>
After Item [22], please add:
-- [30]  Foreign Application Priority Data
   Mar. 26, 1998 (JP) …………………………………..1998-079814 --

Signed and Sealed this

Seventh Day of October, 2003

JAMES E. ROGAN
*Director of the United States Patent and Trademark Office*